United States Patent [19]

Andrews

[11] Patent Number: 4,920,440
[45] Date of Patent: Apr. 24, 1990

[54] COMPOSITE LID ASSEMBLY

[75] Inventor: James H. Andrews, Opelika, Ala.

[73] Assignee: Ampex Corporation, Redwood City, Calif.

[21] Appl. No.: 288,516

[22] Filed: Dec. 22, 1988

[51] Int. Cl.⁵ .................... G11B 23/087; B65D 45/16
[52] U.S. Cl. ..................................... 360/132; 220/326
[58] Field of Search ........................ 360/132; 242/199; 220/326

[56] References Cited

U.S. PATENT DOCUMENTS 4,130,221 12/1978 Peterson .............................. 220/326
4,670,809 6/1987 Teuber ................................ 360/132

Primary Examiner—Robert S. Tupper
Attorney, Agent, or Firm—Harry G. Thibault; Richard P. Lange

[57] ABSTRACT

A composite door assembly for a magnetic tape cassette includes a hinge pin having a first torsion spring element at one end encapsulated in the molded door, a second torsion spring element disposed at an opposite end of the pin for mounting on the cassette, with the opposite ends of the hinge pin secured to the cassette to mount the door on the cassette, and with the first and second torsion spring elements biased to maintain the door in a closed position.

6 Claims, 3 Drawing Sheets

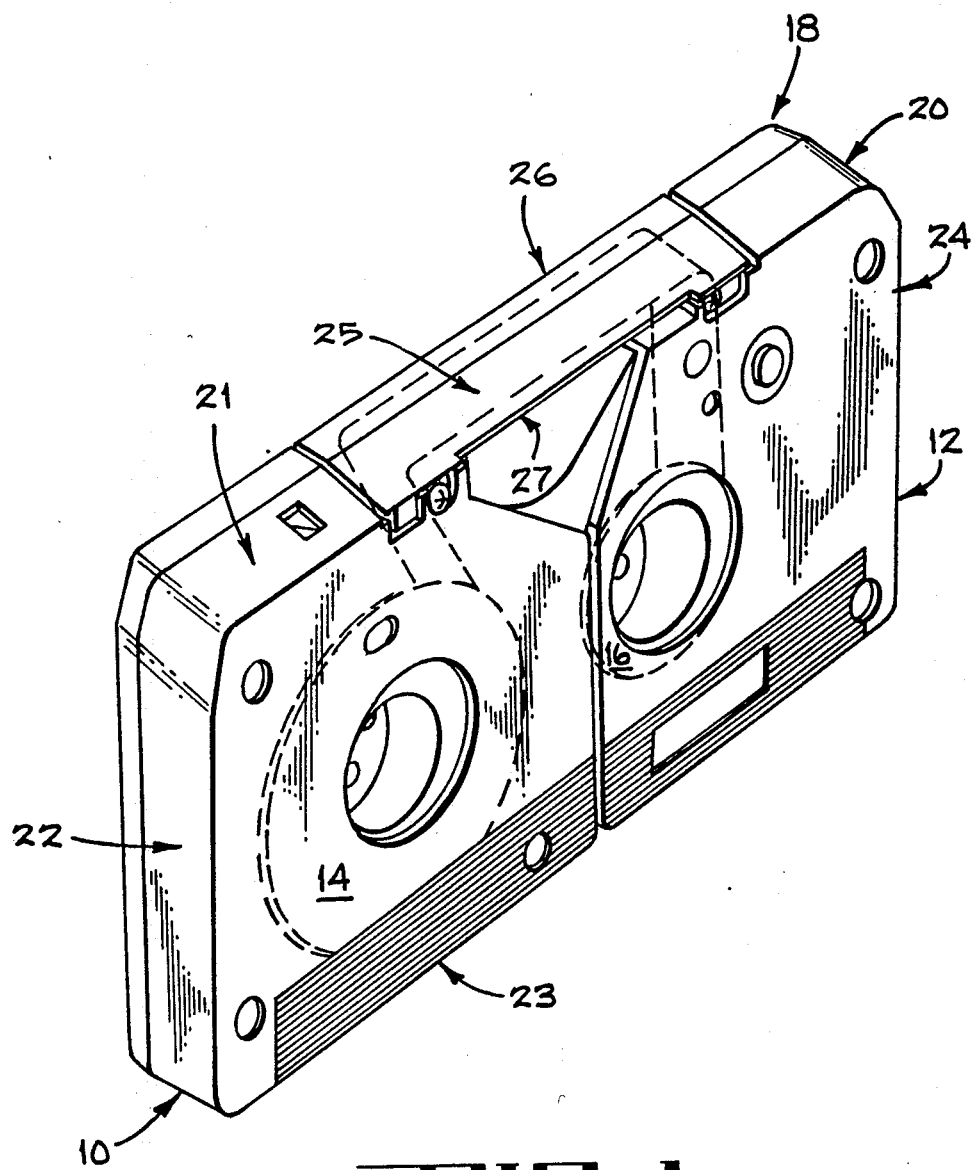
FIG_1

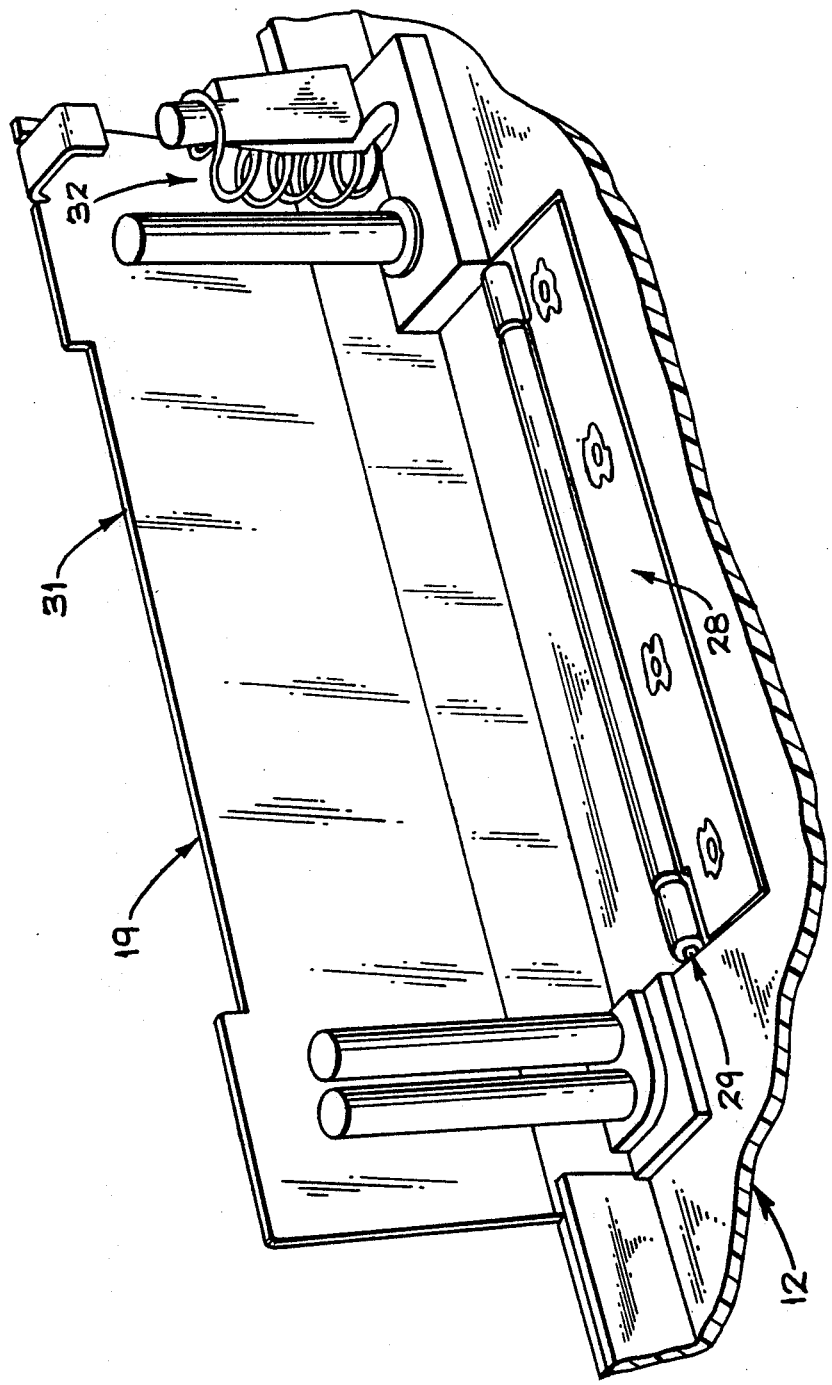
FIG_2 (PRIOR ART)

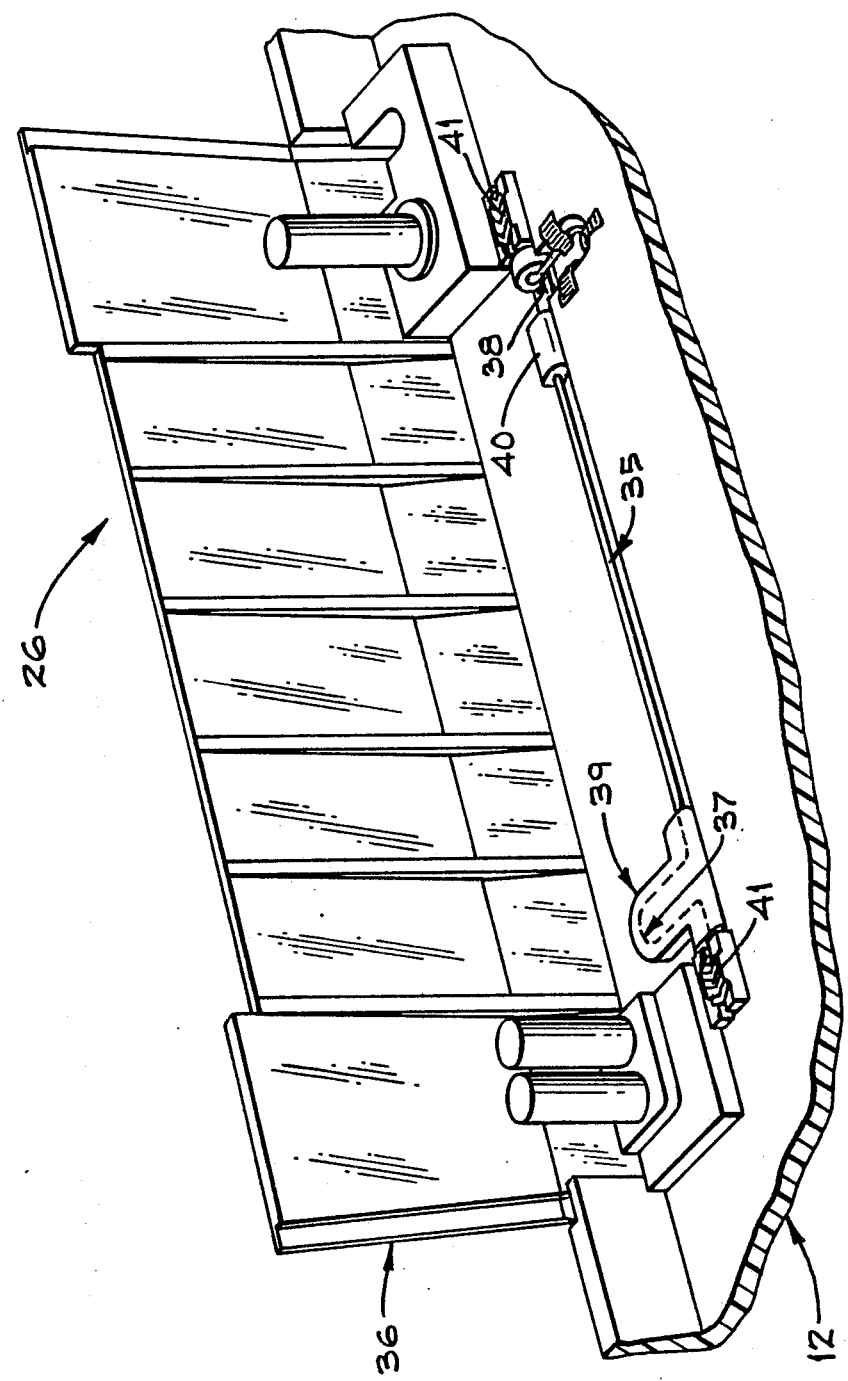

COMPOSITE LID ASSEMBLY

This invention pertains to video cassettes generally and in particular to an improved door lid assembly for the cassette.

A video cassette generally comprises a plastic housing defined by a cover and a base, the cover and base supported by and separated from each other by respective sidewalls. Within the interior of the cassette housing is a supply of magnetic recording tape, the tape disposed on a first or supply reel for transport to a second or take up reel.

In the transport of tape from the first to the second reel, the tape must be disposed for reading or writing thereon by an associated video tape transport. To accomplish the read/write application the tape must be exposed to the reading/writing apparatus of the transport.

Accordingly a tape access opening is provided in one of the sidewalls, with a cassette door or cassette lid assembly overlying the opening, the door to be opened to expose the tape within the cassette to the read/write apparatus of the transport when the cassette is in the loaded position in the transport, with the door to be closed when the cassette is not in the transport, the closed door to protect the magnetic recording tape within the cassette housing from environmental exposure and effects.

Thus the door assembly is not a trivial component of the cassette structure. The door must close firmly and solidly each time the cassette is removed from the transport and remain in the closed position as long as the cassette is stored away from the transport to protect the environmentally sensitive magnetic recording tape contained therein from the elements. Moreover the door must open without fail to a position defined by relatively tight tolerances to assure that the transport operating apparatus engaging the tape for read/write operations will be able to engage the tape each time the cassette is inserted into the transport.

Accordingly the mechanism which controls the transport door must be reliable, efficient, long-lasting and relatively simple. And any new design of the door mechanism which substantially increases the reliability, effectiveness, and endurance of the assembly or substantially improves its cost effectiveness is an important advance in cassette construction.

A known door assembly for a cassette incorporates four parts—the cassette lid or door, the cassette hinge, the hinge pin, and a closure spring. Moreover these parts are metal parts and must be finished after installation to match the finish of the plastic housing and give the completed cassette a finished look. Furthermore, efforts to improve the door assembly have heretofore offered little advance over the above-described structure. For example, another known structure for a cassette assembly employs a torsion spring as a hinge pin, with one end of the torsion spring connected to the door and an opposite end connected to the frame. Although such structure may be more efficient than the door closure apparatus first described above, certain efficiencies of structure and design are lost in the multipart assembly provided in such a torsion spring arrangement.

What is needed is a relatively simple structure with a composite lid assembly captured entirely within a minimal number of parts, such assembly to be simply mounted on the cassette housing, such assembly to incorporate reliability, endurance, and simplicity within a cost-effective design.

The present invention provides an efficient, simple, reliable composite cassette door or lid assembly, the assembly comprising a hinge incorporating a first torsion spring element encapsulated within the door assembly and a second spring element mounted on the cassette housing, with opposite ends of the hinge pin disposed for mounting on the cassette housing, the completed assembly retaining the composite door in the closed position. In such structure the hinge is eliminated, with only portions of the molded door supporting and containing the hinge pin. Moreover the closure spring in the four-piece structure described above is eliminated. Finally both ends of the hinge pin are disposed for mounting on the housing to simplify the composite lid structure and to provide for ease of assembly with respect to the fastening of the composite lid to the housing.

These and other advantages will be more readily understood when the detailed description set forth below is considered with the accompanying drawings in which:

DESCRIPTION OF THE DRAWINGS

FIG. 1 is a front perspective view of a cassette assembly which incorporates the composite lid assembly of the present invention;

FIG. 2 is a rear perspective view, taken from the interior of the cassette, of a prior art lid assembly; and FIG. 3 is a rear perspective view, taken from the interior of the cassette, of a composite lid assembly constructed in accordance with present invention.

DETAILED DESCRIPTION

Referring first to FIG. 1, there is shown a magnetic tape cassette 10 having a housing 12 for retaining a pair of tape reels 14 and 16 rotatably supported therein. The cassette housing 12 comprises cover 18 and 20 separated in generally spaced relation by respective sidewalls 21, 22, 23 and 24.

In a front sidewall 21 is disposed a composite door assembly 26, the assembly 26 operable to expose a supply of magnetic tape 25 mounted on the supply reel 14 for transport across an access opening 27 in the sidewall 21 to be taken up by the reel 6. When the cassette 10 is inserted into an appropriate tape transport (not shown), an associated mechanism of the transport engages the cassette door 26 and opens it to expose the tape 25 to an associated read/write mechanism (not shown) of the transport.

To examine the door assembly 26 in greater detail FIGS. 2 and 3 are provided. In FIG. 2, a prior art assembly is shown. Prior door assembly 19 incorporates a hinge 28, a hinge pin 29 connecting the hinge 28 to a door or lid 31, with a lid closure spring 32, such as the tension spring 32 shown in FIG. 2 for retaining the lid 31 in the closed position. The four part cassette lid assembly of the prior art were typically metal parts, which had to be finished to match the finish of the plastic cassette housing 12.

In the composite door assembly 26 of the present invention (FIG. 3), a door assembly 26 comprises two parts, the hinge pin 35 and a molded door or lid 36. The hinge pin 35 comprises an elongated pin having a first torsion spring loop element 37 at one end of the pin 35 and a second torsion spring loop element 38 at the opposite end of pin 35. The door mold 36 includes a lid member 39 that encapsulates the first loop element 37 to secure one end of the hinge pin 35 to the lid 36. The door mold 36 also includes a narrow fastening band 40 which secures the opposite end of hinge pin 35 to the lid 36.

The composite hinge pin/lid assembly 35, 36 can then be readily secured to the cover 18 of the housing 12 by heat staking opposite ends 41 of the hinge pin 35 to the cover 18. The second loop element 38 is also heat staked to cover 18 so that the torsion loop elements 37, 38 are so disposed with respect to the lid 36 and the hinge pin 35 that the lid 36 is biased to the closed position shown in FIG. 3. When the lid 36 is opened it moves against the bias of the torsion loops 37, 38 to close the lid 36 when the cassette 10 is removed from the transport.

Note the simplicity of design in FIG. 3 as compared to FIG. 2. The hinge pin 35 replaces the hinge 28 and the hinge pin 29 of the prior structure shown in FIG. 2. The tension coil spring 32 of FIG. 2 is completely eliminated. One end of hinge pin 35 is fastened to the lid 36 by the band 40 and the other element 38 is encapsulated in the lid 36 by the member 39 to provide an effective one piece mechanism for mounting within the cassette housing 12. The composite hinge pin/lid assembly 35,36 permits both ends of the hinge pin 35 to be mounted on the cassette housing 12. Compactness of design and ease of assembly is provided by the present invention.

Applicant has described a preferred embodiment of his invention. In the embodiment described forth above the reader can be expected to envision other structures of similar design and performing similar functions. Accordingly applicant intends to define his invention solely in terms of the claims set forth below.

What is claimed is:

1. A tape cassette having a supply reel for holding a supply of tape at a first position for transport to a take up reel for receiving the tape transported from the supply reel, the cassette comprising:
    a housing having a top wall, a bottom wall and associated side walls defining an interior for rotatably supporting respective supply reel and takeup reel therein;
    a sidewall portion defining an opening in the cassette;
    means for guiding tape between said reels and across said opening to provide a tape access area at the opening, said access opening permitting the withdrawal of the tape from the cassette; and
    a composite lid assembly mountable on the cassette at the opening to close the tape access area, said composite lid assembly including a door and a hinge assembly integral with the door, said hinge assembly including a longitudinal hinge pin having opposite ends, a first torsion spring element disposed at one end of the hinge pin and mounted in the door to be integral therewith, a second torsion spring element disposed at an opposite end of the pin for mounting on the cassette, and said opposite ends of the hinge pin fixedly mountable on the cassette so as to position said first and second torsion spring elements to retain the door in a closed position with respect to the cassette.

2. A magnetic tape cassette as claimed as claimed in claim 1 wherein the door comprises a molded element including an encapsulating member encapsulating a first torsion loop element of the hinge pin in the molded door.

3. A magnetic tape cassette as claimed in claim 2 wherein the end of the hinge pin opposite the first torsion element is molded into the door by a fastening band which captures said opposite end of the hinge pin for rotatable movement therein.

4. A magnetic tape cassette as claimed in claim 3 wherein the second torsion loop element is secured to the cover as by heat staking.

5. A magetic tape cassette as claimed in claim 4 wherein the opposite ends of the hinge pin are secured to the cover as by heat staking.

6. In a tape cassette having a supply reel for holding a supply of tape at a first position for transport to a take up reel for receiving the tape transported from the supply reel, the cassette comprising a housing having a top wall, a bottom wall and associated side walls defining an interior for rotatably supporting respective supply reel and takeup reel therein, a side wall portion defining an opening in the cassette, and means for guiding tape between said reels and across said opening to provide a tape access area at the opening, said access opening permitting the withdrawal of tape from the cassette, a method for closing the tape access area, the method comprising:
    mounting a composite lid assembly on the cassette at the opening to close the tape access area, said composite lid assembly including a door and a hinge assembly integral with the door;
    including in the hinge assembly a longitudinal hinge pin having opposite ends;
    disposing a first torsion spring element at one end of the hinge pin and mounting said first spring element in the door to be integral therewith;
    disposing a second torsion spring element at an opposite end of the pin for mounting on the cassette; and
    fixedly mounting said opposite ends of the hinge pin on the cassette so as to position said first and second torsion spring elements to retain the door in a closed position with respect to the cassette.

* * * * *